US011870153B2

(12) United States Patent
Chiang et al.

(10) Patent No.: US 11,870,153 B2
(45) Date of Patent: Jan. 9, 2024

(54) ELECTRONIC DEVICE AND ANTENNA STRUCTURE THEREOF

(71) Applicant: WISTRON NEWEB CORPORATION, Hsinchu (TW)

(72) Inventors: Cheng-Wei Chiang, Hsinchu (TW); Cheng-Rui Zhang, Hsinchu (TW); Ching-Wen Chen, Hsinchu (TW)

(73) Assignee: WISTRON NEWEB CORPORATION, Hsinchu (TW)

(*) Notice: Subject to any disclaimer, the term of this patent is extended or adjusted under 35 U.S.C. 154(b) by 0 days.

(21) Appl. No.: 17/810,689

(22) Filed: Jul. 5, 2022

(65) Prior Publication Data

US 2023/0178887 A1 Jun. 8, 2023

(30) Foreign Application Priority Data

Dec. 7, 2021 (TW) ................................ 110145605

(51) Int. Cl.
*H01Q 3/24* (2006.01)
*H01Q 5/328* (2015.01)

(52) U.S. Cl.
CPC ............ *H01Q 3/247* (2013.01); *H01Q 5/328* (2015.01)

(58) Field of Classification Search
CPC ........ H01Q 3/247; H01Q 5/328; H01Q 5/357; H01Q 5/364; H01Q 5/378; H01Q 1/243
See application file for complete search history.

(56) References Cited

U.S. PATENT DOCUMENTS 8,552,919 B2 10/2013 Hsieh et al.
9,825,362 B2 * 11/2017 Lee ........................ H01Q 5/371
9,935,378 B2 * 4/2018 Camacho ............... H01Q 5/371
10,389,024 B2 * 8/2019 Tseng ....................... H01Q 9/42
2004/0104849 A1 * 6/2004 Tai ......................... H01Q 5/371 343/702
2004/0178957 A1 * 9/2004 Chang .................... H01Q 5/357 343/702

(Continued)

FOREIGN PATENT DOCUMENTS

CN 107645034 B * 1/2020 ............. H01Q 1/243
CN 110870139 A * 3/2020 ............... H01Q 1/12

(Continued)

*Primary Examiner* — Dimary S Lopez Cruz
*Assistant Examiner* — Jordan E. DeWitt
(74) *Attorney, Agent, or Firm* — McClure, Qualey & Rodack, LLP

(57) ABSTRACT

An electronic device and an antenna structure thereof are provided. The antenna structure includes a first, a second and a third radiating element and a grounding element. The first radiating element includes a first and a second radiating portion, a feeding portion and a grounding portion. The grounding portion includes a first, a second, a third, a fourth and a fifth section. The first section is connected between the first radiating portion and the feeding portion. The grounding element is connected with the fourth section and the fifth section. The second radiating element is connected with the grounding element. The second radiating element includes a third radiating portion, and the third and the second radiating portion are coupled with each other. The third radiating element is connected with the feeding portion, and the third radiating element and the first section are coupled with each other.

17 Claims, 6 Drawing Sheets

(56) References Cited

U.S. PATENT DOCUMENTS

2005/0116865 A1* 6/2005 Fang .................... H01Q 9/42 343/702
2005/0190108 A1* 9/2005 Lin .................... H01Q 5/371 343/702
2008/0136711 A1* 6/2008 Lai .................... H01Q 5/392 343/700 MS
2009/0021448 A1* 1/2009 Tsai .................... H01Q 1/38 343/893
2009/0237308 A1* 9/2009 Tsai .................... H01Q 5/378 343/700 MS
2010/0039331 A1* 2/2010 Tai .................... H01Q 5/371 343/700 MS
2010/0123639 A1* 5/2010 Tai .................... H01Q 21/29 343/893
2010/0134366 A1* 6/2010 Yu .................... H01Q 1/38 343/742
2011/0037672 A1* 2/2011 Tseng .................... H01Q 1/243 343/700 MS
2011/0279341 A1* 11/2011 Chang .................... H01Q 5/392 343/822
2012/0001803 A1* 1/2012 Shau .................... H01Q 1/243 343/700 MS
2012/0274517 A1* 11/2012 Nagoshi .................... H01Q 5/357 343/700 MS
2013/0033411 A1* 2/2013 Tsai .................... H01Q 1/48 343/905
2013/0187820 A1* 7/2013 Ng .................... H01Q 5/371 343/793
2013/0207861 A1* 8/2013 Huang .................... H01Q 1/2266 343/700 MS
2014/0049431 A1* 2/2014 Tai .................... H01Q 1/243 343/700 MS
2015/0029071 A1* 1/2015 Hwang .................... H01Q 5/35 343/845
2015/0061949 A1* 3/2015 Lee .................... H01Q 5/378 343/722
2015/0145744 A1* 5/2015 Kao .................... H01Q 9/42 343/852
2015/0200456 A1* 7/2015 You .................... H01Q 9/42 343/750
2016/0028152 A1* 1/2016 Anguera Pros ...... H01Q 9/0485 343/702
2016/0164192 A1* 6/2016 Lin .................... H01Q 5/314 343/749
2016/0190681 A1* 6/2016 Huang .................... H01Q 13/10 343/848
2017/0125916 A1* 5/2017 Camacho .................... H01Q 5/371
2018/0048076 A1* 2/2018 Wei .................... H01Q 1/243
2018/0269578 A1* 9/2018 Wu .................... H01Q 5/40
2019/0044218 A1* 2/2019 Ye .................... H01Q 5/50
2019/0334241 A1* 10/2019 Han .................... H01Q 9/045
2020/0106178 A1* 4/2020 Chou .................... H01Q 1/2291
2021/0013607 A1* 1/2021 Tai .................... H01Q 1/48
2021/0013630 A1* 1/2021 Ye .................... H01Q 1/246
2021/0351509 A1* 11/2021 Lin .................... H01Q 5/328
2022/0294113 A1* 9/2022 Chiang .................... H01Q 9/26
2023/0178887 A1* 6/2023 Chiang .................... H01Q 3/247 343/702

FOREIGN PATENT DOCUMENTS

JP 5831753 B2 * 12/2015
TW M381183 U1 5/2010
TW 201421808 A * 6/2014 .......... H01Q 1/2266
TW I499132 B 9/2015
TW 533332 U * 12/2016 .......... H01Q 1/242
TW I734468 B 7/2021

* cited by examiner

ELECTRONIC DEVICE AND ANTENNA STRUCTURE THEREOF

CROSS-REFERENCE TO RELATED PATENT APPLICATION

This application claims the benefit of priority to Taiwan Patent Application No. 110145605, filed on Dec. 7, 2021. The entire content of the above identified application is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to an electronic device, and more particularly to an electronic device including an antenna structure.

BACKGROUND OF THE DISCLOSURE

Firstly, electronic devices such as notebook computers, not only tend to be thin and light in appearance, but also take into account high performance. In the related art, when the antenna structure in the electronic device is designed to meet the requirement of low profile height, the bandwidth (especially the high frequency bandwidth) is obviously insufficient.

Therefore, how to improve the communication quality of the electronic device by improving the design of the antenna structure so as to overcome the above-mentioned defects has become one of the important issues to be solved in the related field.

SUMMARY OF THE DISCLOSURE

In response to the above-referenced technical inadequacy, the present disclosure provides an electronic device and an antenna structure thereof.

In one aspect, the present disclosure provides an electronic device, which includes an antenna structure and a feeding element. The antenna structure includes a first radiating element, a grounding element, a second radiating element, and a third radiating element. The first radiating element includes a first radiating portion, a second radiating portion, a feeding portion and a grounding portion. The first radiating portion extends along a first direction, the second radiating portion extends along a second direction. The first direction and the second direction are opposite to each other, the feeding portion is connected between the first radiating portion and the second radiating portion. The grounding portion includes a first section connected between the first radiating portion and the feeding portion, a second section connected to the first section and turned relative to the first section, a third section connected to the second section and turned relative to the second section, and a fourth section and a fifth section both connected to the third section and turned relative to the third section, and the fourth section and the fifth section are separate from each other by a first predetermined gap ranging from 1 mm to 20 mm. The grounding element is connected to the fourth section and the fifth section. The second radiating element is connected to the grounding element. The second radiating element includes a third radiating portion, and the third radiating portion and the second radiating portion are separate from each other and coupled with each other. The third radiating element is connected to the feeding portion, and the third radiating element and the first section are separate from each other and coupled with each other. The feeding element includes a feeding end and a grounding end, the feeding end is electrically connected to the feeding portion, and the grounding end is electrically connected to the grounding element.

Therefore, in the electronic device and the antenna structure thereof provided by the present disclosure, by virtue of "the fourth section and the fifth section being separate from each other by a first predetermined gap ranging from 1 mm to 20 mm" and "the third radiating element being connected to the feeding portion, and the third radiating element and the first section being separate from each other and coupled with each other," the operating frequency band generated by the antenna structure of the electronic device can meet the requirement of high frequency bandwidth.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The described embodiments may be better understood by reference to the following description and the accompanying drawings, in which.

DETAILED DESCRIPTION OF THE EXEMPLARY EMBODIMENTS

Figure 1:
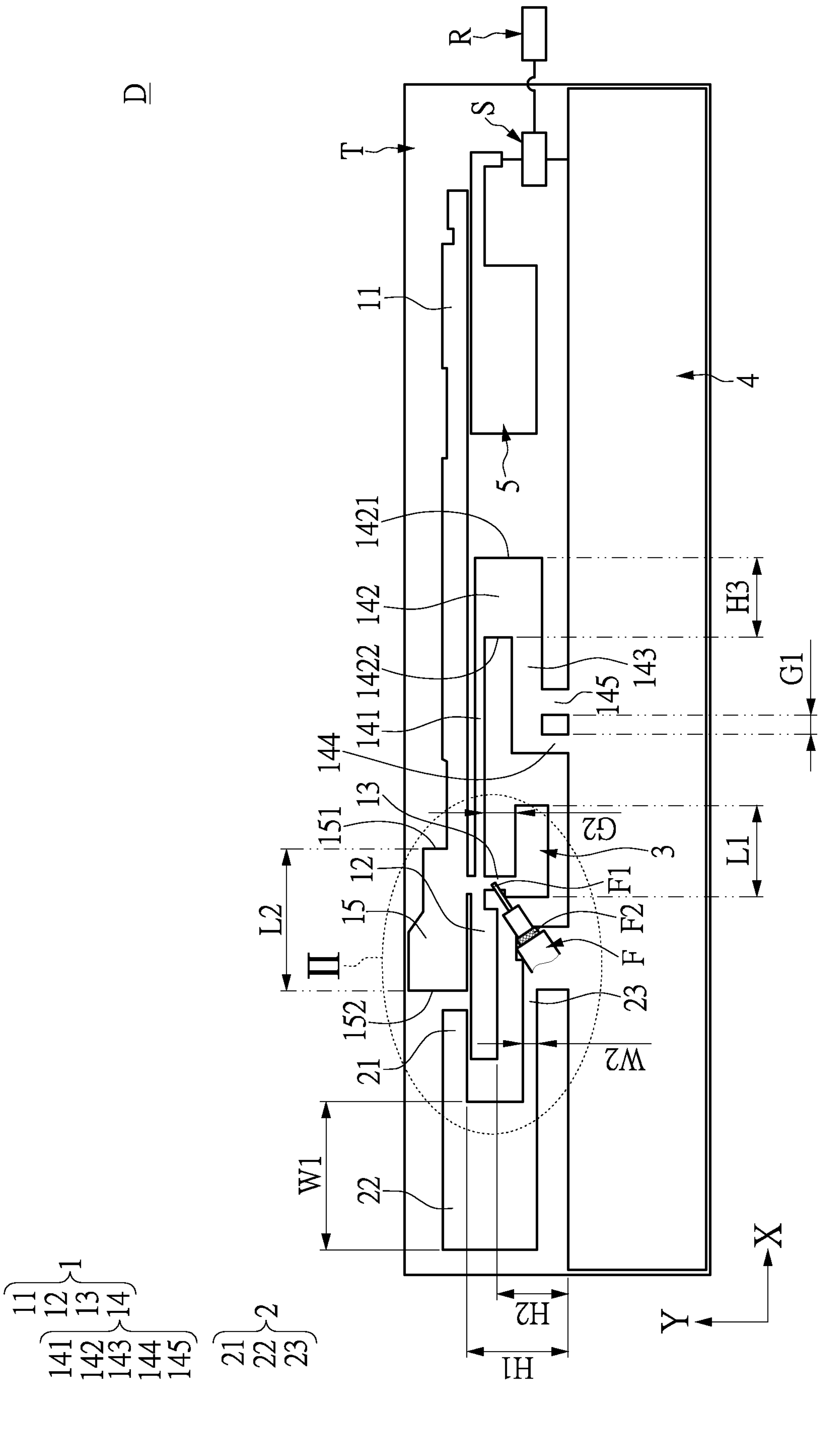
FIG. 1 is a schematic side view of an antenna structure according to an embodiment of the present disclosure.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, signals or the like, which are for distinguishing one component/signal from another one only, and are not intended to, nor should be construed to impose any substantive limitations on the components, signals or the like.

EMBODIMENTS

Referring to FIG. 1, the present disclosure provides an electronic device D, which includes an antenna structure and a feeding element F. The antenna structure includes a first radiating element 1, a second radiating element 2, a third radiating element 3 and a grounding element 4. Moreover, the antenna structure further includes a substrate T, and the first radiating element 1, the second radiating element 2 and a grounding element 4 are disposed on the substrate T. For example, the first radiating element 1, the second radiating element 2, the third radiating element 3 and the grounding element 4 can be metal sheets, metal conducting wires or any conductors with conductive effect, and the feeding element F can be a coaxial cable, the substrate T can be a flame retardant 4 (FR4) substrate, a printed circuit board (PCB) or a flexible printed circuit board (FPCB). However, the aforementioned details are disclosed for exemplary purposes only, and are not meant to limit the scope of the present disclosure.

According to the above description, the first radiating element 1 includes a first radiating portion 11, a second radiating portion 12, a feeding portion 13 and a grounding portion 14. The first radiating portion 11 extends along a first direction (i.e., a positive X-axis direction), and the second radiating portion 12 extends along a second direction (i.e., a negative X-axis direction). That is to say, the first direction and the second direction are opposite to each other, so that the first radiating portion 11 and the second radiating portion 12 are parallel to each other and extend in opposite directions. Moreover, the length of the first radiating portion 11 extending in the first direction is greater than the length of the second radiating portion 12 extending in the second direction. The feeding portion 13 is connected between the first radiating portion 11 and the second radiating portion 12, and the feeding portion 13 can extend toward a third direction (i.e., a negative Y-axis direction) relative to a connection between the feeding portion 13 and the second radiating portion 12. One end of the grounding portion 14 is connected between the first radiating portion 11 and the feeding portion 13, and the other end of the grounding portion 14 is connected to the grounding member 4. Therefore, the first radiating element 1 of the present disclosure can be a planar inverted-F antenna (PIFA) structure. However, the aforementioned details are disclosed for exemplary purposes only, and are not meant to limit the scope of the present disclosure.

Furthermore, the second radiating element 2 is connected to the grounding element 4. The second radiating element 2 includes a third radiating portion 21, and the third radiating portion 21 and the second radiating portion 12 are separate from each other and coupled with each other. The third radiating element 3 is connected to the feeding portion 13, and the third radiating element 3 and a first section 141 of the ground portion 14 are separate from each other and coupled with each other. The feeding element F includes a feeding end F1 and a grounding end F2, the feeding end F1 is electrically connected to the feeding portion 13, and the grounding end F2 is electrically connected to the grounding element 4. For example, the third radiating portion 21 can be configured to generate a center frequency about 1700 MHz, the second radiating portion 12 can be configured to generate a center frequency about 2500 MHz, and the third radiating portion 21 and the second radiating portion 12 are separate from each other and coupled with each other so as to excite or generate a first operating frequency band having a frequency range (i.e., a bandwidth) between 1710 MHz and 2690 MHz.

Figure 2:
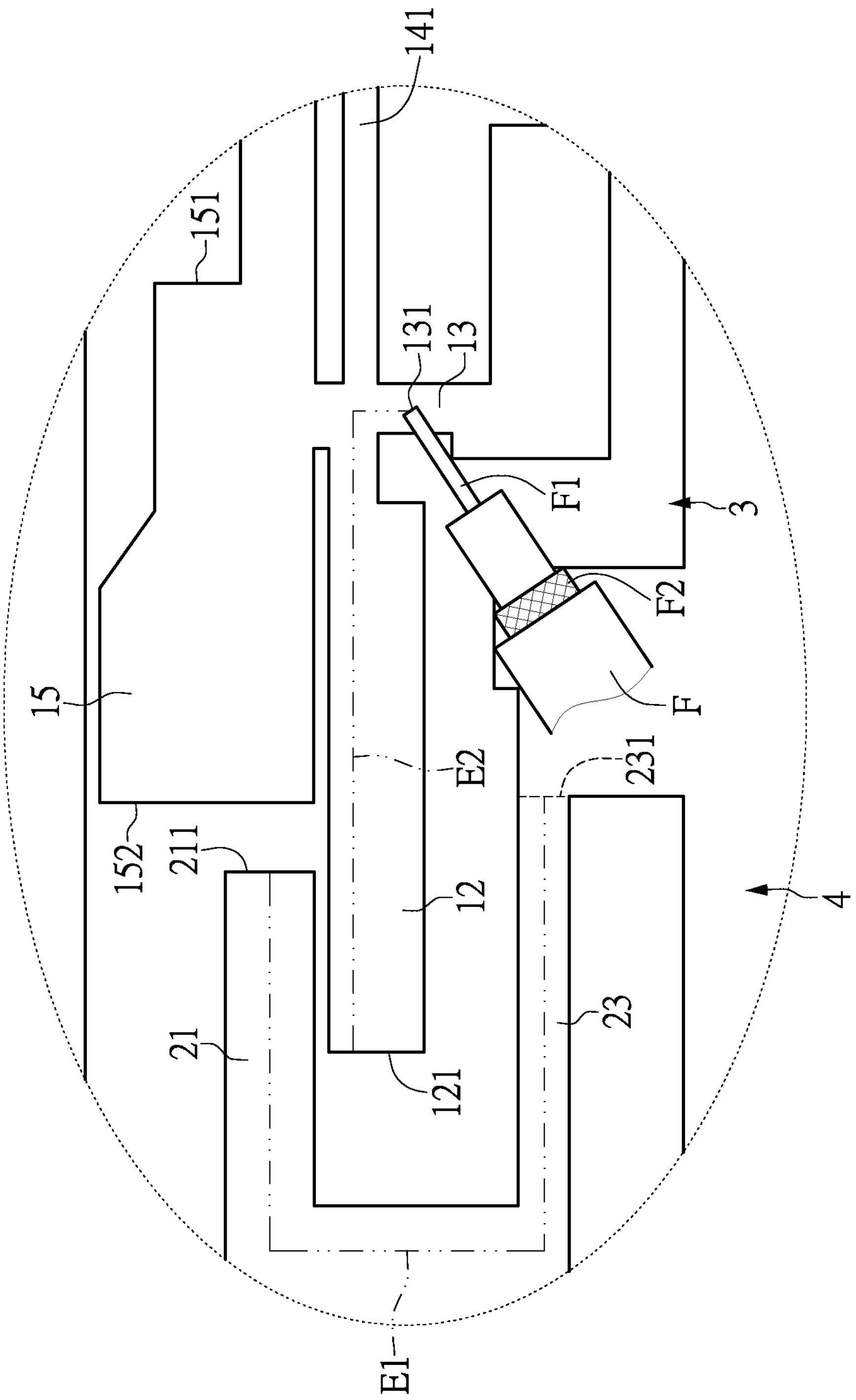
FIG. 2 is a schematic enlarged view of part II of FIG. 1.

Referring to FIG. 1 and FIG. 2, FIG. 2 is a schematic enlarged view of part II of FIG. 1. The second radiating element 2 includes a main body 22 and a connection portion 23, the connection portion 23 is connected to the grounding element 4, and the main body 22 is connected between the third radiating portion 21 and the connection portion 23. The feeding portion 13 has a feeding position 131, and the feeding position 131 is a connection in which the feeding end F1 of the feeding element F is connected to the feeding portion 13. Therefore, the feeding element F is electrically connected to the feeding end F1 through the feeding position 131 so as to feed a signal, and transmits the signal to the feeding portion 13. There is a first electrical length E1 between a connection end 231 of the connection portion 23 that is electrically connected to the grounding element 4 and an open end 211 of the third radiating portion 21, and there is a second electrical length E2 between a feeding position 131 of the feeding portion 13 and an open end 121 of the second radiating portion 12, and the first electrical length E1 is greater than the second electrical length E2 (it should be noted that the electrical length is a length of an electrical path when the signal is transmitted on a radiating element). In addition, the main body 22 has a first predetermined width W1 along or parallel to the first direction (such as a horizontal direction), the connection portion 23 has a second predetermined width W2 along or parallel to a third direction (such as a vertical direction) that is perpendicular to the first direction, and the first predetermined width W1 is greater than twice the second predetermined width W2. The present disclosure can further adjust the bandwidth of the first operating frequency band of the antenna structure so as to make the bandwidth greater than the range from 1710 MHz to 2690 MHz by using the above-mentioned technical feature that the first predetermined width W1 is greater than twice the second predetermined width W2.

According to the above description, more particularly, the third radiating portion 21 and the grounding element 4 are separate from each other by a first predetermined distance H1, the second radiating portion 12 and the grounding element 4 are separate from each other by a second predetermined distance H2, and the first predetermined distance H1 is different from the second predetermined distance H2. It is worth mentioning that, in the embodiment, the first predetermined distance H1 is greater than the second predetermined distance H2. That is to say, the third radiating portion 21 is further away from the grounding element 4 than the second radiating portion 12. Therefore, the third radiating portion 21 is configured to be farther away from the grounding element 4 than the second radiating portion 12 so as to improve the gain in the bandwidth range between 1710 MHz and 2300 MHz in the first operating frequency band.

Continue to refer to FIG. 1, the grounding portion 14 includes a first section 141 connected between the first radiating portion 11 and the feeding portion 13, a second section 142 connected to the first section 141 and turned relative to the first section 141, a third section 143 connected to the second section 142 and turned relative to the second section 142, and a fourth section 144 and a fifth section 145 both connected between the third section 143 and the grounding element 4 and turned relative to the third section 143. The third radiating element 3 and the first section 141 of the grounding portion 14 are separate from each other and coupled with each other for generating a second operating frequency band ranging from 3 GHz to 4 GHz. The third radiating element 3 has a first predetermined length L1 extending along the first direction and on the first direction, and the first predetermined length L1 is equal to λ/16 of a center frequency of the second operating frequency band. It should be noted that there is a second predetermined gap G2 between the third radiating element 3 and the first section 141. In the present disclosure, the length of the second predetermined gap G2 can be adjusted so as to make the third radiating element 3 closer to the first section 141 (i.e., the second predetermined gap G2 is smaller), thereby increasing the coupling amount between the third radiating element 3 and the first section 141, and adjusting the bandwidth from 3 GHz to 4 GHz.

According to the above description, the second section 142 of the grounding portion 14 can be configured for generating a third operating frequency band ranging from 4 GHz to 6 GHz. The second section 142 can extend along a third direction, the second section 142 has a first lateral side 1421 and a second lateral side 1422 that are parallel to the third direction, and a third predetermined distance H3 between the first lateral side 1421 and the second lateral side 1422 is equal to λ/16 of a center frequency of the third operating frequency band. More particularly, the fourth section 144 and the fifth section 145 are parallel to each other, and the fourth section 144 and the fifth section 145 are separate from each other by a first predetermined gap G1 ranging from 1 mm to 20 mm.

Continue to refer to FIG. 1, the first radiating element 1 further includes a fourth radiating portion 15 connected to the first radiating portion 11. The fourth radiating portion 15 can extend along the second direction that is opposite to the first radiating portion 11. The fourth radiating portion 15, the third radiating portion 21 and the second radiating portion 12 are separate from each other and coupled with each other for generating a fourth operating frequency band ranging from 4 GHz to 5 GHz. More particularly, the fourth radiating portion 15 has a second predetermined length L2 extending along the second direction (or between two opposite lateral sides 151, 152 of the fourth radiating portion 15), and the second predetermined length L2 is equal to λ/4 of a center frequency of the fourth operating frequency band. Moreover, the antenna structure further includes a fourth radiating element 5 electrically connected to the grounding element 4, the first radiating portion 11 can be configured to generate a center frequency about 824 MHz, and the first radiating portion 11 and the fourth radiating element 5 are separate from each other and coupled with each other so as to excite or generate a fifth operating frequency band having a frequency range between 698 MHz and 960 MHz.

According to the above description, more particularly, the fourth section 144 is related to low frequencies (i.e., the fifth operating frequency band ranging from 698 MHz to 960 MHz), and the fifth section 145 is related to high frequencies (i.e., the second and third operating bands ranging from 3 GHz to 6 GHz). In the present disclosure, by adjusting the width of the first predetermined gap G1, the length of the electrical path passing through the fourth section 144 or the fifth section 145 can be adjusted, so that the frequency can be shifted. For example, when the position of the fourth section 144 is fixed, the width of the first predetermined gap G1 can be widened or increased (that is to say, the fifth section 145 moves along the positive X-axis direction), so that the frequency can be shifted to the high frequency. When the width of the first predetermined gap G1 is narrowed or decreased (that is to say, the fifth section 145 moves along the negative X-axis direction), so that the frequency can be shifted to the low frequency. On the contrary, when the position of the fifth section 145 is fixed, the width of the first predetermined gap G1 can be widened or increased (that is to say, the fourth section 144 moves along the negative X-axis direction), so that the frequency can be shifted to the low frequency. When the width of the first predetermined gap G1 is narrowed or decreased (that is to say, the fourth section 144 moves to the positive X-axis direction), so that the frequency can be shifted to the high frequency.

Figure 4:
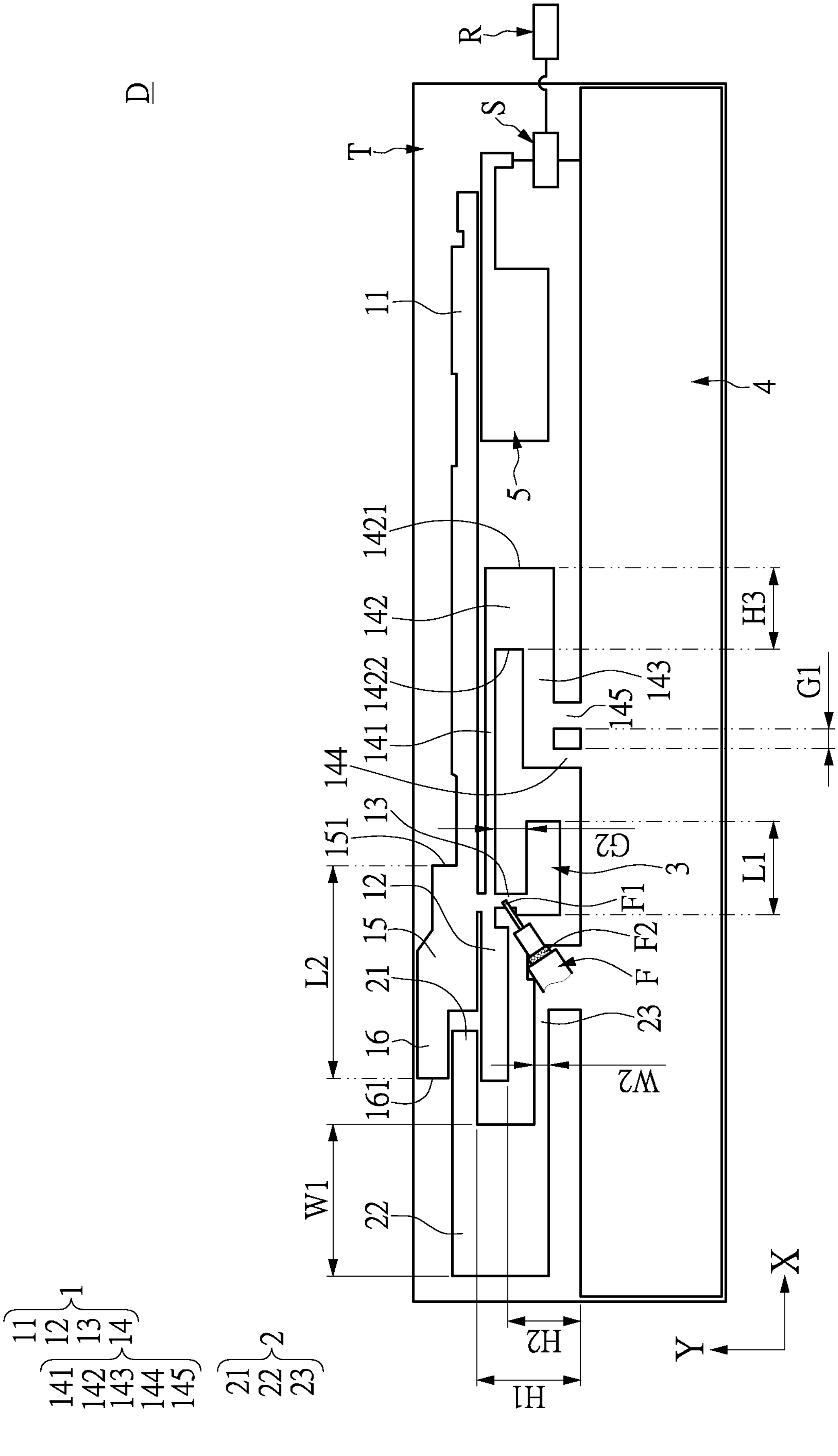
FIG. 4 is a schematic side view of the antenna structure according to another embodiment of the present disclosure.

Referring to FIG. 1 and FIG. 4, FIG. 4 is a schematic view of the antenna structure according to another embodiment of the present disclosure. Comparing FIG. 4 with FIG. 1, the main difference between the two different embodiments is as follows: as shown in FIG. 4, the fourth radiating portion 15 further includes a radiating branch 16 extending along the second direction (that is opposite to an extending direction of the third radiating portion 21). More particularly, the radiating branch 16 is disposed above the third radiating portion 21, and the second radiating portion 12 is disposed below the third radiating portion 21. That is to say, the third radiating portion 21 is disposed between the radiating branch 16 and the second radiating portion 12. Therefore, the present disclosure can adjust the bandwidth and the impedance matching of the antenna structure at high frequency (5 GHz) by setting the radiating branch 16. It is worth mentioning that, in the embodiment as shown in FIG. 4, the second predetermined length L2 is a distance between the lateral side 151 of the fourth radiating portion 15 and an open end 161 of the radiating branch 16.

Figure 3:
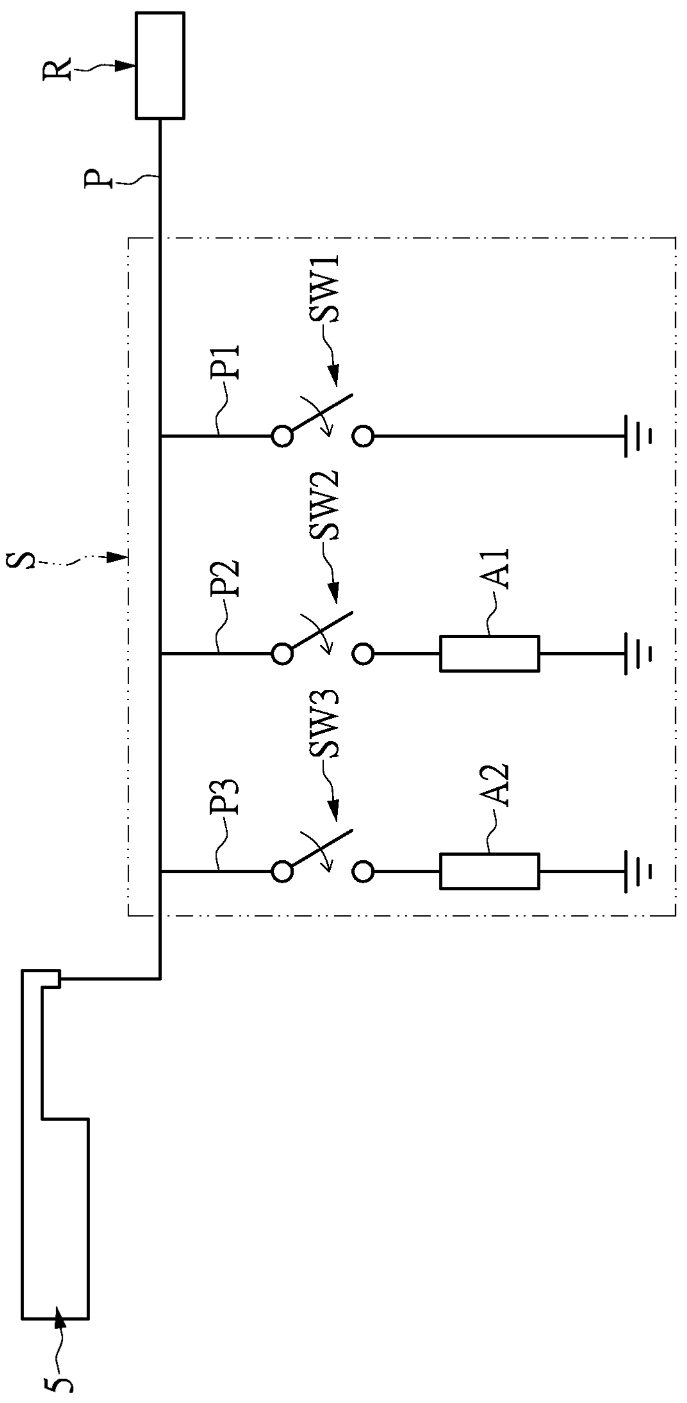
FIG. 3 is a schematic view of a switching circuit, a control circuit and a fourth radiating element as shown in FIG. 1.

Referring to FIG. 1 and FIG. 3, FIG. 3 is a schematic view of a switching circuit, a control circuit and a fourth radiating element as shown in FIG. 1. The antenna structure further includes a switching circuit S electrically connected to the fourth radiating element 5 and the grounding element 4. The present disclosure can use the switching circuit S to adjust a center frequency of the fifth operating frequency band, and the fourth radiating element 5 can be coupled with the first radiating element 1 so as to generate different center frequencies of an operating frequency band by the switching circuit S. For example, the switching circuit S includes a first mode and a second mode, the first mode has a first path P1, and the second mode has a second path P2. In addition, the first path P1 has a first impedance value, and the second path P2 has a second impedance value different from the first impedance value.

Furthermore, the electronic device D further includes a control circuit R electrically connected to the switching circuit S, and The control circuit R can control the switching circuit S to switch to one of the first mode and the second mode (that is to say, the switching circuit S can be switched for providing one of the first mode and the second mode by controlling the control circuit R), so as to use the control circuit R to control the operating frequency band of the antenna structure. For example, the control circuit R can be a microcontroller or a circuit on a mainboard to control the switching circuit S. However, the aforementioned details are disclosed for exemplary purposes only, and are not meant to limit the scope of the present disclosure.

For example, the switching circuit S includes a signal conduction path P and at least one ground path electrically connected to the signal conduction path P, and FIG. 3 shows the first path P1, the second path P2 and the third path P3 as an example. Furthermore, a switch (e.g., the first switch SW1, the second switch SW2 and/or the third switch SW3) can connect to at least one ground path in series. In addition, not only the switch can connect to the ground path in series, but also passive elements (e.g., the first passive element A1 and/or the second passive element A2) can connect to the ground path in series. For example, the passive element can be an inductor, a capacitor or a resistor, and the electronic device D can adjust the operating frequency band, the impedance matching, the value of return loss and/or the radiation efficiency of the antenna structure by setting of the passive elements. In addition, the grounding path can also be provided without any passive component, so that the scope of the present disclosure is not limited no matter whether or not the passive components are provided. Moreover, the control circuit R can be used to control the electrical conduction of the ground paths (e.g., the first path P1, the second path P2 and/or the third path P3), thereby switching the switching circuit S to one of the first mode and the second mode due to the electrical conduction of the ground paths.

According to the above description, as shown in FIG. 3, the first path P1, the second path P2 and the third path P3 are respectively electrically connected to the signal conduction path P, and the first path P1, the second path P2 and the third path P3 are respectively connected with the first switch SW1, the second switch SW2 and the third switch SW3 in series. No passive element is provided on the first path P1, a first passive element A1 is connected to the second path P2 in series, and a second passive element A2 is connected to the third path P3 in series. For example, the first passive element A1 on the second path P2 can be a capacitor with 6.8 pF, and the second passive element A2 on the third path P3 can be an inductance with 18 nH. However, the aforementioned details are disclosed for exemplary purposes only, and are not meant to limit the scope of the present disclosure.

In addition, for example, the present disclosure can provide four switch modes. In the first mode, the fourth radiating element 5 is electrically connected to the control circuit R through the signal conduction path P, and the first path P1, the second path P2 and the third path P3 are all in an OFF state (such as an open circuit in a non-conducting state) at the same time. In the second mode, the fourth radiating element 5 is grounded through the first path P1 (that is to say, the fourth radiating element 5 is electrically connected to the control circuit R through the signal conducting path P), and the first path P1 is in an ON state (such as a closed circuit in a conducting state) and both the second path P2 and the third path P3 are in an OFF state at the same time. In the third mode, the fourth radiating element 5 is grounded through the second path P2 (that is to say, the fourth radiating element 5 is electrically connected to the control circuit R through the signal conduction path P), and the second path P2 is in an ON state and both the first path P1 and the third path P3 are in an OFF state at the same time. In the fourth mode, the fourth radiating element 5 is grounded through the third path P3 (that is to say, the fourth radiating element 5 is electrically connected to the control circuit R through the signal conducting path P), and the third path P3 is in an ON state and both the first path P1 and the second path P2 are in an OFF state at the same time.

Therefore, when the first path P1 is in an ON state and both the second path P2 and the third path P3 are in an OFF state, the center frequency of the operating frequency band between 698 MHz and 960 MHz can be closer to 698 MHz. When the second path P2 is in an ON state and both the first path P1 and the third path P3 are in an OFF state, the center frequency of the operating frequency band between 698 MHz and 960 MHz can be closer to 960 MHz. In other words, the switching circuit S can choose to use the first passive element A1 and/or the second passive element A2 to adjust the center frequency of the fifth operating frequency band.

Figure 5:
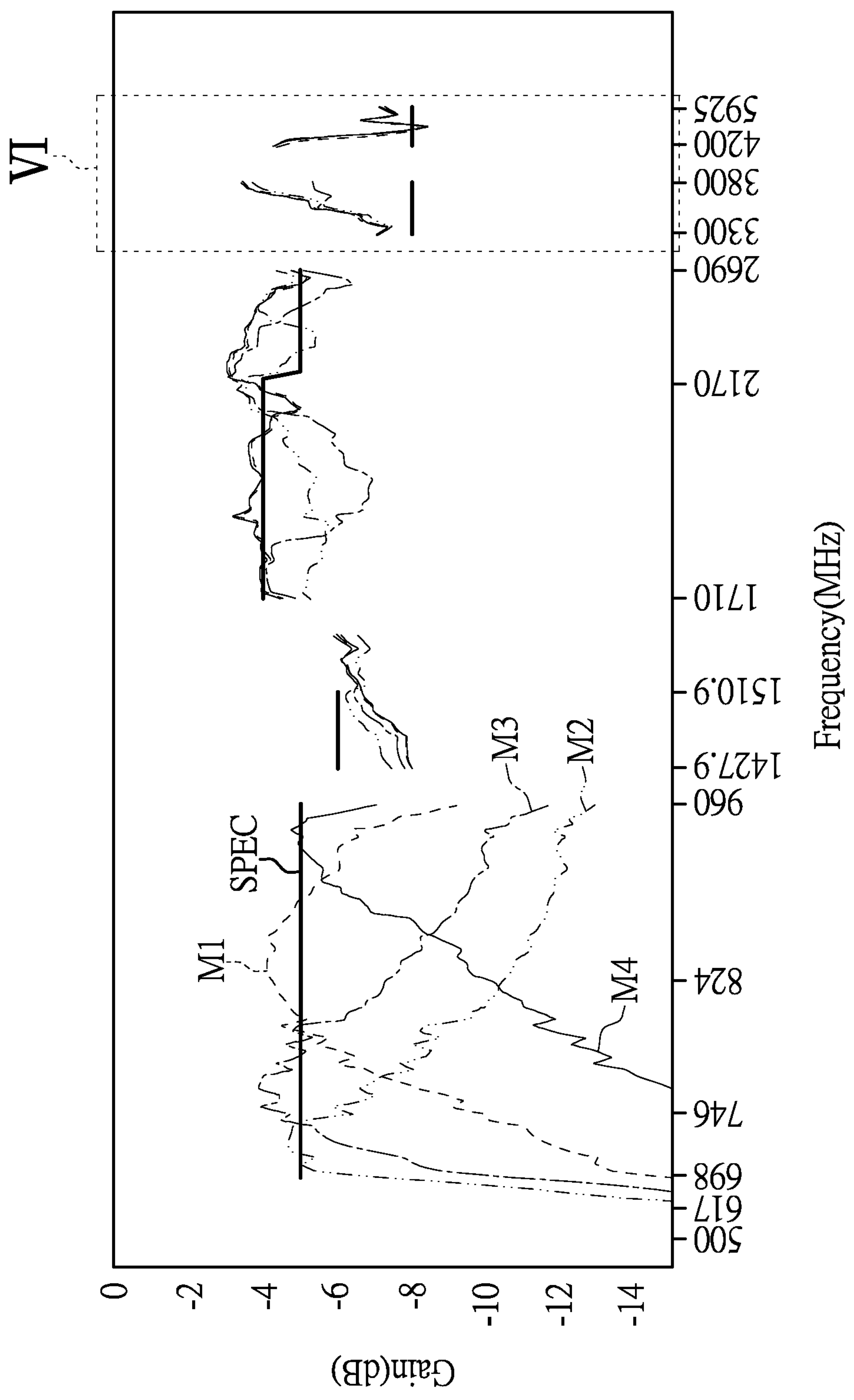
FIG. 5 is a schematic diagram of the performance of the antenna structure according to the present disclosure.
Figure 6:
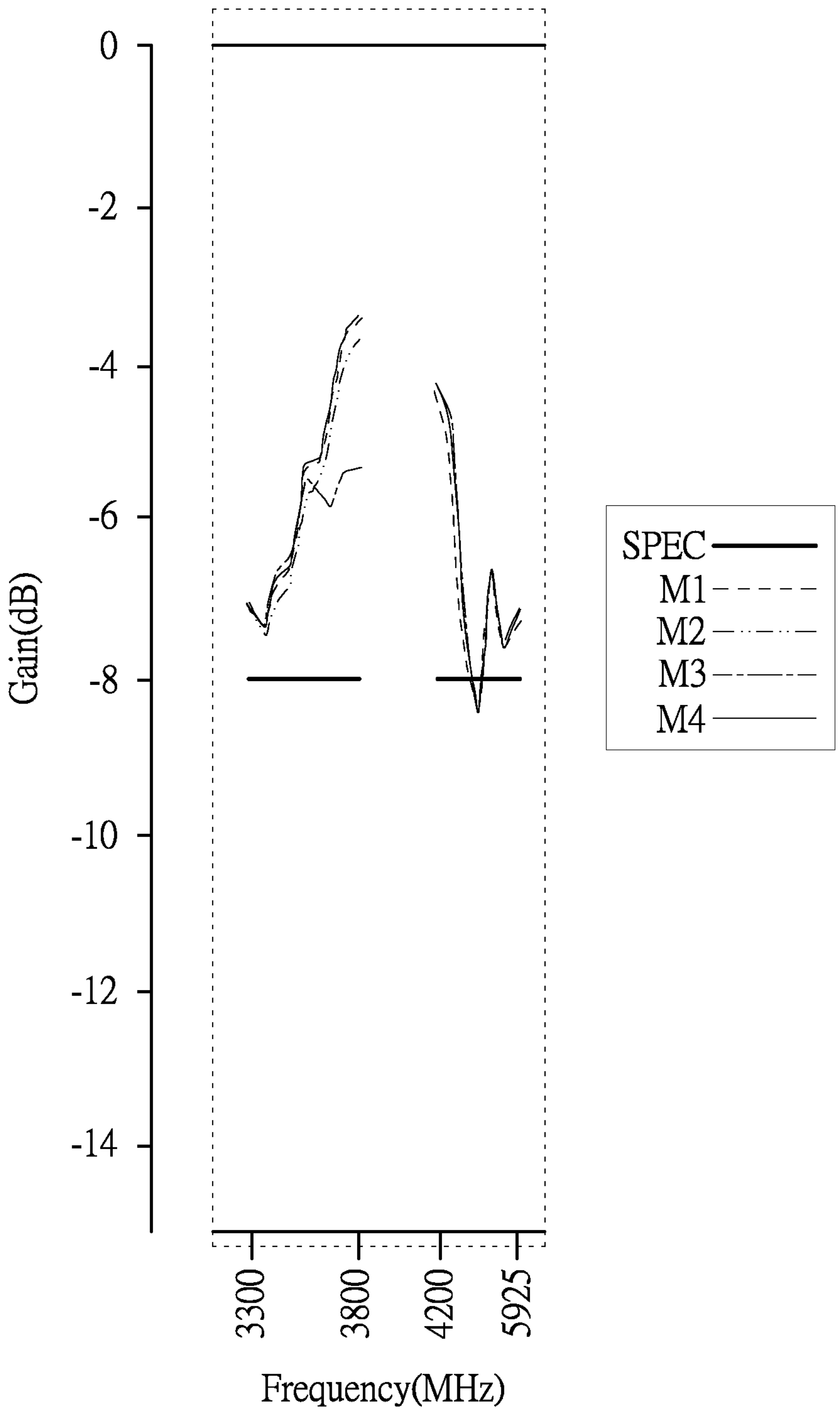
FIG. 6 is a schematic enlarged view of part VI of FIG. 5.

Next, referring to FIG. 5 and FIG. 6, FIG. 5 is a schematic diagram of the performance of the antenna structure of the present disclosure, FIG. 6 is an enlarged schematic diagram of part VI of FIG. 5, and the curve M1 in FIG. 5 and FIG. 6 is a curve of the return loss of the electronic device D in the first mode. In the first mode, the fourth radiating element 5 is electrically connected to the control circuit R through the signal conduction path P, and all of the first switch SW1, the second switch SW2 and the third switch SW3 are in an OFF state. The curve M2 in FIG. 5 and FIG. 6 is a curve of the return loss of the electronic device D in the second mode. In the second mode, the fourth radiating element 5 is electrically connected to the control circuit R through the signal conduction path P, the first switch SW1 is in an ON state, and both the second switch SW2 and the third switch SW3 are in an OFF state. The curve M3 in FIG. 5 and FIG. 6 is a curve of the return loss of the electronic device D in the third mode. In the third mode, the fourth radiating element 5 is electrically connected to the control circuit R through the signal conducting path P, the second switch SW2 is in an ON state, and both the first switch SW1 and the third switch SW3 are in an OFF state. The curve M4 in FIG. 5 and FIG. 6 is a curve of the return loss of the electronic device D in the fourth mode. In the fourth mode, the fourth radiating element 5 is electrically connected to the control circuit R through the signal conducting path P, and the third switch SW3 is in an ON state, and both the first switch SW1 and the second switch SW2 are in an OFF state. Therefore, the present disclosure can adjust the operating frequency band, the impedance matching, the return loss value and/or the radiation efficiency generated by the antenna structure through the selection of different paths, so that the bandwidth generated by the antenna structure can meet user requirements (i.e., the specifications (SPEC) shown in FIG. 5 and FIG. 6).

Beneficial Effects of the Embodiments

In conclusion, in the electronic device D and the antenna structure thereof provided by the present disclosure, the third radiating portion 21 and the second radiating portion 12 are separate from each other and coupled with each other so as to excite a first operating frequency band having a frequency range (i.e., a bandwidth) between 1710 MHz and 2690 MHz, and the third radiating element 3 and the first section 141 of the grounding portion 14 are separate from each other and coupled with each other for generating a second operating frequency band ranging from 3 GHz to 4 GHz. In addition, the second section 142 of the grounding portion 14 can be configured for generating a third operating frequency band ranging from 4 GHz to 6 GHz. Moreover, the fourth radiating portion 15, the third radiating portion 21 and the second radiating portion 12 are separate from each other and coupled with each other for generating a fourth operating frequency band ranging from 4 GHz to 5 GHz. Furthermore, the first radiating portion 11 and the fourth radiating element 5 are separate from each other and coupled with each other so as to excite or generate a fifth operating frequency band having a frequency range between 698 MHz and 960 MHz. Therefore, the operating frequency band generated by the antenna structure of the electronic device D can meet the requirements of high frequency and low frequency bandwidth, and conform to the specification of Sub-6 full-band antenna.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. An electronic device, comprising:

an antenna structure including:

a first radiating element including a first radiating portion, a second radiating portion, a feeding portion and a grounding portion, wherein the first radiating portion extends along a first direction, the second radiating portion extends along a second direction, the first direction and the second direction are opposite to each other, the feeding portion is connected between the first radiating portion and the second radiating portion, the grounding portion includes a first section connected between the first radiating portion and the feeding portion, a second section connected to the first section and turned relative to the first section, a third section connected to the second section and turned relative to the second section, and a fourth section and a fifth section both connected to the third section and turned relative to the third section, and the fourth section and the fifth section are separate from each other by a first predetermined gap ranging from 1 mm to 20 mm;

a grounding element connected to the fourth section and the fifth section;

a second radiating element connected to the grounding element, wherein the second radiating element includes a third radiating portion, and the third radiating portion and the second radiating portion are separate from each other and coupled with each other; and a third radiating element connected to the feeding portion, wherein the third radiating element and the first section are separate from each other and coupled with each other; and a feeding element including a feeding end and a grounding end, wherein the feeding end is electrically connected to the feeding portion, and the grounding end is electrically connected to the grounding element.

2. The electronic device according to claim 1, wherein the third radiating element and the first section of the grounding portion are coupled with each other for generating a second operating frequency band ranging from 3 GHz to 4 GHz; wherein the third radiating element has a first predetermined length extending along the first direction, and the first predetermined length is equal to λ/16 of a center frequency of the second operating frequency band.

3. The electronic device according to claim 1, wherein the third radiating portion and the second radiating portion are coupled with each other for generating a first operating frequency band ranging from 1710 MHz to 2690 MHz; wherein the third radiating portion and the grounding element are separate from each other by a first predetermined distance, the second radiating portion and the grounding element are separate from each other by a second predetermined distance, and the first predetermined distance is different from the second predetermined distance.

4. The electronic device according to claim 1, wherein the second section of the grounding portion is configured for generating a third operating frequency band ranging from 4 GHz to 6 GHz; wherein the second section extends along a third direction, the second section has a first lateral side and a second lateral side that are parallel to the third direction, and a third predetermined distance between the first lateral side and the second lateral side is equal to λ/16 of a center frequency of the third operating frequency band.

5. The electronic device according to claim 1, wherein the first radiating element further includes a fourth radiating portion connected to the first radiating portion, the fourth radiating portion, the third radiating portion and the second radiating portion are separate from each other and coupled with each other for generating a fourth operating frequency band ranging from 4 GHz to 5 GHz; wherein the fourth radiating portion has a second predetermined length extending along the second direction, and the second predetermined length is equal to λ/4 of a center frequency of the fourth operating frequency band.

6. The electronic device according to claim 5, wherein the fourth radiating portion includes a radiating branch extending along the second direction, and the third radiating portion is disposed between the radiating branch and the second radiating portion.

7. The electronic device according to claim 1, wherein the second radiating element includes a main body and a connection portion, the connection portion is connected to the grounding element, and the main body is connected between the third radiating portion and the connection portion; wherein there is a first electrical length between a connection end of the grounding element and an open end of the third radiating portion, the feeding portion has a feeding position, there is a second electrical length between the feeding position and an open end of the second radiating portion, and the first electrical length is greater than the second electrical length; wherein the main body has a first predetermined width along the first direction, the connection portion has a second predetermined width along a third direction, the first direction is perpendicular to the third direction, and the first predetermined width is greater than twice the second predetermined width.

8. The electronic device according to claim 1, wherein the antenna structure further includes a fourth radiating element and a switching circuit electrically connected to the fourth radiating element; wherein the fourth radiating element is coupled with the first radiating element so as to generate different center frequencies of an operating frequency band by the switching circuit; wherein the switching circuit includes a first mode and a second mode, the first mode has a first path, and the second mode has a second path; wherein the first path has a first impedance value, and the second path has a second impedance value different from the first impedance value.

9. The electronic device according to claim 8, further comprising a control circuit electrically connected to the switching circuit, and the switching circuit is switched for providing one of the first mode and the second mode by controlling the control circuit.

10. An antenna structure, comprising:

a first radiating element including a first radiating portion, a second radiating portion, a feeding portion and a grounding portion, wherein the first radiating portion extends along a first direction, the second radiating portion extends along a second direction, the first direction and the second direction are opposite to each other, the feeding portion is connected between the first radiating portion and the second radiating portion, the grounding portion includes a first section connected between the first radiating portion and the feeding portion, a second section connected to the first section and turned relative to the first section, a third section connected to the second section and turned relative to the second section, and a fourth section and a fifth section both connected to the third section and turned relative to the third section, and the fourth section and the fifth section are separate from each other by a first predetermined gap ranging from 1 mm to 20 mm;

a grounding element connected to the fourth section and the fifth section;

a second radiating element connected to the grounding element, wherein the second radiating element includes a third radiating portion, and the third radiating portion and the second radiating portion are separate from each other and coupled with each other; and a third radiating element connected to the feeding portion, wherein the third radiating element and the first section are separate from each other and coupled with each other.

11. The antenna structure according to claim 10, wherein the third radiating element and the first section of the grounding portion are coupled with each other for generating a second operating frequency band ranging from 3 GHz to 4 GHz; wherein the third radiating element has a first predetermined length extending along the first direction, and the first predetermined length is equal to λ/16 of a center frequency of the second operating frequency band.

12. The antenna structure according to claim 10, wherein the third radiating portion and the second radiating portion are coupled with each other for generating a first operating frequency band ranging from 1710 MHz to 2690 MHz; wherein the third radiating portion and the grounding element are separate from each other by a first predetermined distance, the second radiating portion and the grounding element are separate from each other by a second predetermined distance, and the first predetermined distance is different from the second predetermined distance.

13. The antenna structure according to claim 10, wherein the second section of the grounding portion is configured for generating a third operating frequency band ranging from 4 GHz to 6 GHz; wherein the second section extends along a third direction, the second section has a first lateral side and a second lateral side that are parallel to the third direction, and a third predetermined distance between the first lateral side and the second lateral side is equal to λ/16 of a center frequency of the third operating frequency band.

14. The antenna structure according to claim 10, wherein the first radiating element further includes a fourth radiating portion connected to the first radiating portion, the fourth radiating portion, the third radiating portion and the second radiating portion are separate from each other and coupled with each other for generating a fourth operating frequency band ranging from 4 GHz to 5 GHz; wherein the fourth radiating portion has a second predetermined length extending along the second direction, and the second predetermined length is equal to λ/4 of a center frequency of the fourth operating frequency band.

15. The antenna structure according to claim 14, wherein the fourth radiating portion includes a radiating branch extending along the second direction, and the third radiating portion is disposed between the radiating branch and the second radiating portion.

16. The antenna structure according to claim 10, wherein the second radiating element includes a main body and a connection portion, the connection portion is connected to the grounding element, and the main body is connected between the third radiating portion and the connection portion; wherein there is a first electrical length between a connection end of the grounding element and an open end of the third radiating portion, the feeding portion has a feeding position, there is a second electrical length between the feeding position and an open end of the second radiating portion, and the first electrical length is greater than the second electrical length; wherein the main body has a first predetermined width along the first direction, the connection portion has a second predetermined width along a third direction, the first direction is perpendicular to the third direction, and the first predetermined width is greater than twice the second predetermined width.

17. The antenna structure according to claim 1, further comprising a fourth radiating element and a switching circuit electrically connected to the fourth radiating element; wherein the fourth radiating element is coupled with the first radiating element so as to generate different center frequencies of an operating frequency band by the switching circuit.

* * * * *